United States Patent
Ikehashi

(10) Patent No.: US 8,461,743 B2
(45) Date of Patent: Jun. 11, 2013

(54) ELECTROSTATIC ACTUATOR APPARATUS AND METHOD OF DRIVING THE SAME

(75) Inventor: Tamio Ikehashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 385 days.

(21) Appl. No.: 12/819,564

(22) Filed: Jun. 21, 2010

(65) Prior Publication Data

US 2011/0193501 A1 Aug. 11, 2011

(30) Foreign Application Priority Data

Feb. 10, 2010 (JP) ................................. 2010-028110

(51) Int. Cl.
*H02N 1/00* (2006.01)
*H02N 1/04* (2006.01)

(52) U.S. Cl.
USPC ........... 310/309; 310/310; 318/116; 361/271; 200/181

(58) Field of Classification Search
USPC .................................. 310/309, 310; 318/116
IPC .............................. H02N 1/00,1/04; H01L 41/04
See application file for complete search history.

(56) References Cited

U.S. PATENT DOCUMENTS

| 5,994,796 | A | 11/1999 | De Los Santos | |
|---|---|---|---|---|
| 7,633,213 | B2 * | 12/2009 | Takayama et al. | 310/331 |
| 7,751,173 | B2 * | 7/2010 | Ikehashi et al. | 361/271 |
| 8,120,451 | B2 * | 2/2012 | Yoon et al. | 335/78 |
| 2006/0055281 | A1 * | 3/2006 | Yassini | 310/309 |
| 2007/0181411 | A1 * | 8/2007 | Ikehashi et al. | 200/181 |
| 2009/0072630 | A1 * | 3/2009 | Miyazaki | 307/138 |
| 2009/0121662 | A1 * | 5/2009 | Miyazaki | 318/116 |
| 2010/0163376 | A1 * | 7/2010 | Yoon et al. | 200/181 |
| 2011/0193501 | A1 * | 8/2011 | Ikehashi | 318/116 |

FOREIGN PATENT DOCUMENTS

JP 2007-242607 9/2007
JP 2009-070670 4/2009

OTHER PUBLICATIONS

International Rectifier, Application Note AN-978, International Rectifier, Mar. 23, 2007.*
First Office Action for Japanese Application No. 2010-028110 Dated Mar. 26, 2013, 4 pgs.

* cited by examiner

*Primary Examiner* — John K Kim
(74) *Attorney, Agent, or Firm* — Turocy & Watson, LLP

(57) ABSTRACT

According to one embodiment, a method of driving an electrostatic actuator includes a first electrode provided on a substrate, a second electrode arranged above the first electrode to be movable in a vertical direction, and an insulating film provided between the first electrode and the second electrode, includes boosting a power supply voltage to generate a driving voltage of the electrostatic actuator, and applying the driving voltage to each of the first electrode and the second electrode when setting the electrostatic actuator in an up state.

10 Claims, 5 Drawing Sheets

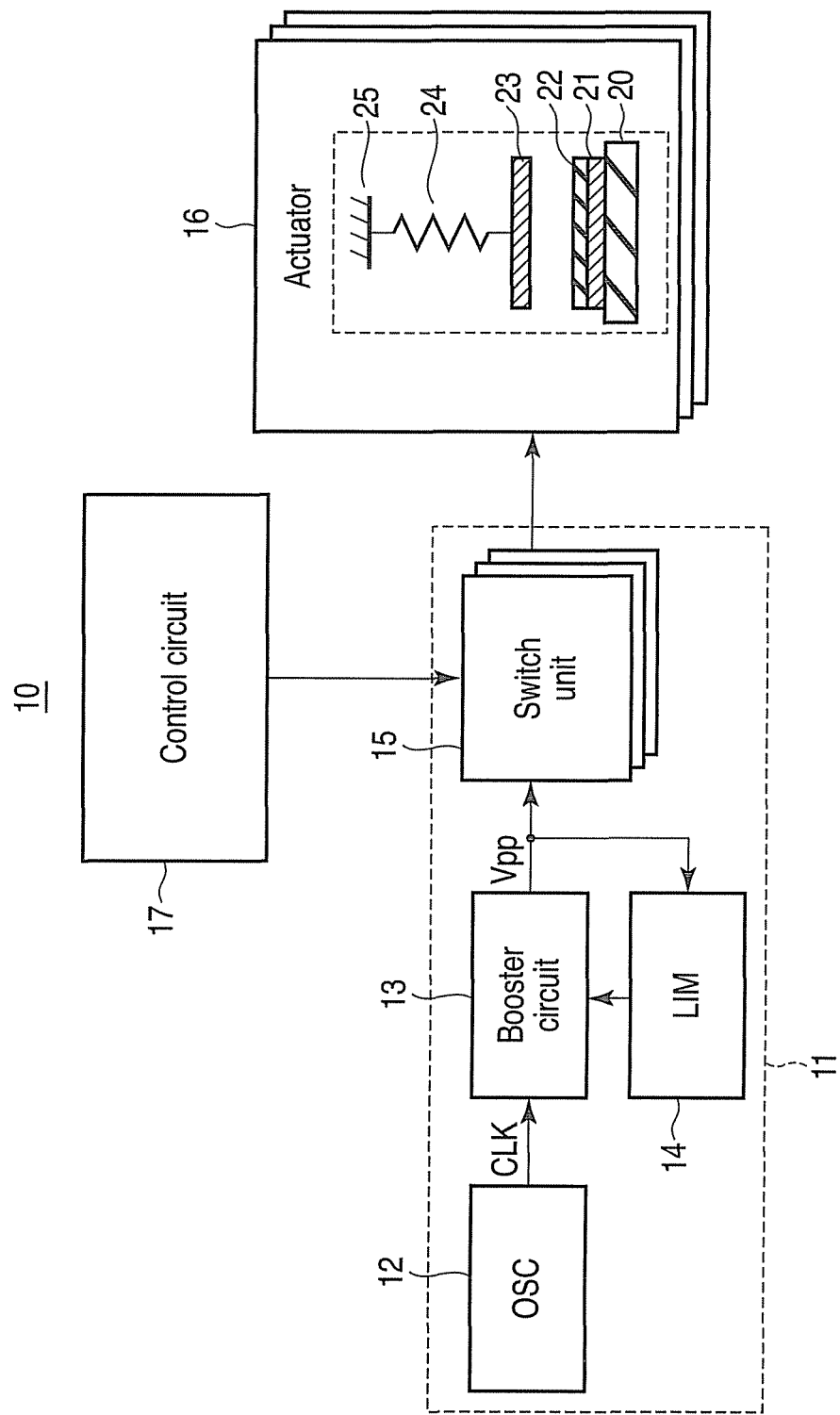
F I G. 1

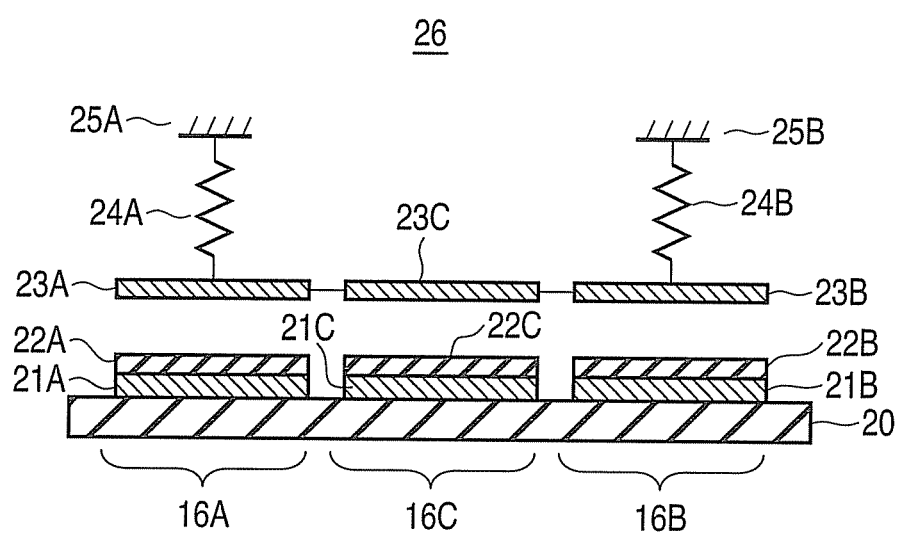
F I G. 2

ELECTROSTATIC ACTUATOR APPARATUS AND METHOD OF DRIVING THE SAME

CROSS-REFERENCE TO RELATED APPLICATIONS

This application is based upon and claims the benefit of priority from Japanese Patent Application No. 2010-028110, filed Feb. 10, 2010; the entire contents of which are incorporated herein by reference.

FIELD

Embodiments described herein relate generally to an electrostatic actuator apparatus and a method of driving the same.

BACKGROUND

Radio-frequency micro-electromechanical systems (RF-MEMS) variable capacitors or RF-MEMS switches using MEMS techniques have been developed. These MEMS variable capacitors and MEMS switches use electrostatic actuators.

The driving voltage of an electrostatic actuator is generated by a booster circuit provided in a semiconductor device. To drive the electrostatic actuator, a high voltage of, e.g., 10 V or more is necessary. The booster circuit takes time to generate the high voltage. As a result, MEMS switching slows down.

BRIEF DESCRIPTION OF THE DRAWING

FIG. 1 is a block diagram showing the arrangement of an electrostatic actuator apparatus 10 according to an embodiment;

FIG. 2 is a sectional view showing an example of the arrangement of a variable capacitor device 26 using electrostatic actuators;

DETAILED DESCRIPTION

Figure 3:
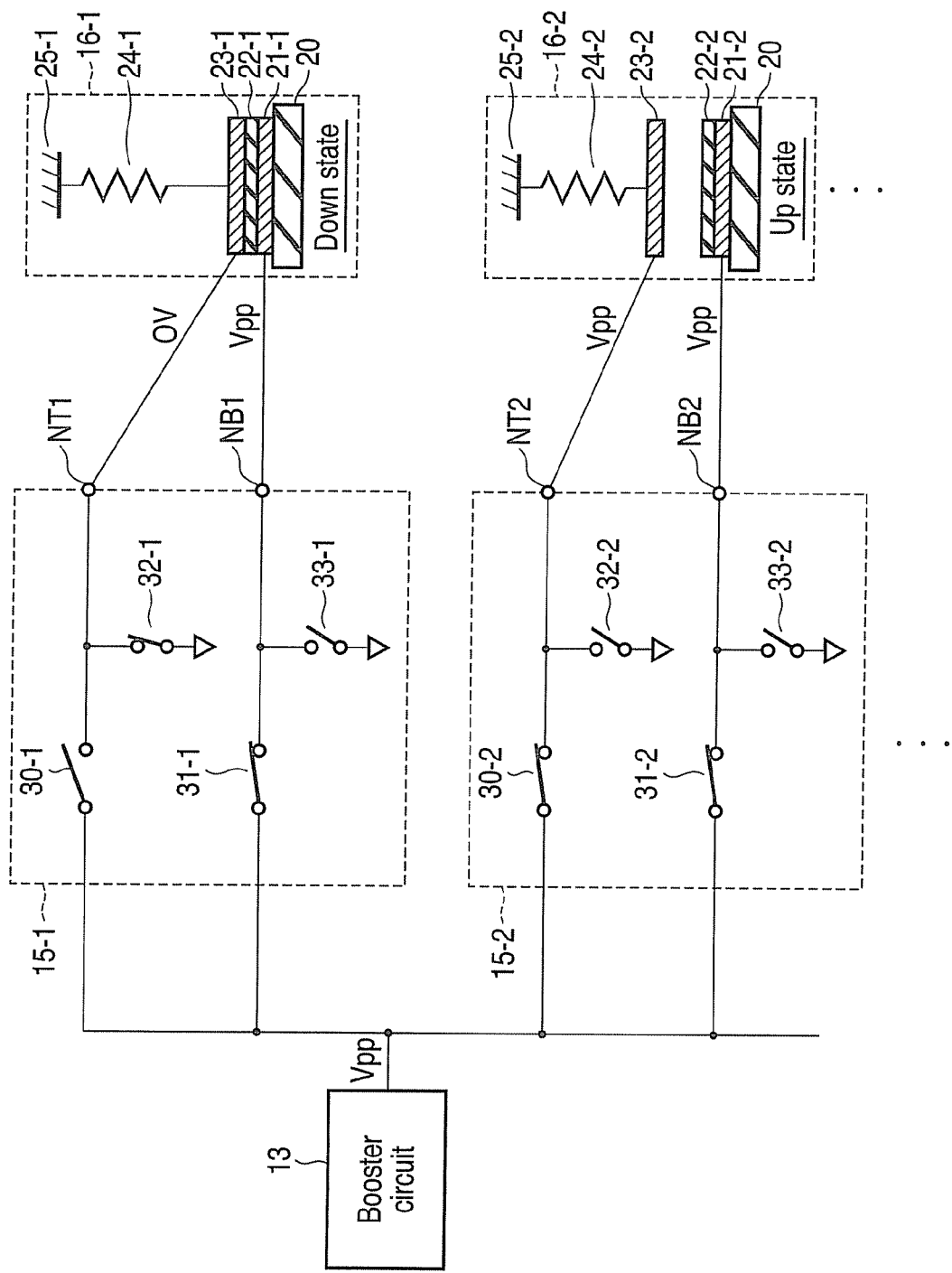
FIG. 3 is a circuit diagram showing the arrangement of a switch unit 15.

In general, according to one embodiment, there is provided a method of driving an electrostatic actuator comprising a first electrode provided on a substrate, a second electrode arranged above the first electrode to be movable in a vertical direction, and an insulating film provided between the first electrode and the second electrode, the method comprising:

boosting a power supply voltage to generate a driving voltage of the electrostatic actuator; and applying the driving voltage to each of the first electrode and the second electrode when setting the electrostatic actuator in an upstate.

The embodiments will be described hereinafter with reference to the accompanying drawings. In the description which follows, the same or functionally equivalent elements are denoted by the same reference numerals, to thereby simplify the description.

FIG. 1 is a block diagram showing the arrangement of an electrostatic actuator apparatus 10 according to an embodiment. The electrostatic actuator apparatus 10 comprises n (n is an integer greater than zero) electrostatic actuators 16-1 to 16-n, a driving circuit 11 which drives the electrostatic actuators 16, and a control circuit 17 which controls the operation of the driving circuit 11. The driving circuit 11 comprises an oscillator (OSC) 12, booster circuit 13, limiter (LIM) 14, and n switch units 15-1 to 15-n (equal to the number of electrostatic actuators 16). The driving circuit 11 and the electrostatic actuators 16 are formed on, for example, the same substrate.

The booster circuit 13 boosts a power supply voltage Vdd to generate a voltage Vpp higher than the power supply voltage Vdd. The booster circuit 13 comprises, for example, a charge pump. The charge pump executes a pump operation using a clock CLK supplied from the oscillator 12.

The limiter 14 is connected to the booster circuit 13. The limiter 14 prevents the output from the booster circuit 13 from exceeding a predetermined voltage. This allows the booster circuit 13 to output a stable voltage.

Each switch unit 15 applies a driving voltage to a corresponding electrostatic actuator 16 to control its operation. The switch unit 15 also controls the electrostatic actuator 16 based on a control signal supplied from the control circuit 17.

Each electrostatic actuator 16 comprises a first electrode 21 formed on, for example, an insulating substrate 20, an insulating film 22 provided on the first electrode 21, and a second electrode 23 provided above the insulating film 22 to be movable in the vertical direction. The second electrode 23 is connected to a fixed portion 25 via an elastic body (e.g., spring) 24. The insulating substrate 20 includes a glass substrate, an insulating layer formed on a silicon substrate or the like. Note that the insulating film 22 need only prevent electrical contact between the first electrode 21 and the second electrode 23. Hence, the insulating film 22 need only be provided between the first electrode 21 and the second electrode 23. For example, the insulating film 22 may be provided either only under the second electrode 23 or both on the first electrode 21 and under the second electrode 23.

The electrostatic actuator may form part of, for example, a variable capacitor device 26 as shown in FIG. 2. A first electrostatic actuator 16A comprises a first electrode 21A, insulating film 22A, second electrode 23A, spring 24A, and fixed portion 25A. A second electrostatic actuator 16B comprises a first electrode 21B, insulating film 22B, second electrode 23B, spring 248, and fixed portion 25B. A variable capacitor 16C comprises a first electrode 21C provided on the substrate 20, an insulating film 22C provided on the first electrode 21C, and a second electrode 23C provided above the insulating film 22C to be movable in the vertical direction.

The second electrode 23C has its two terminals fixed to the second electrodes 23A and 23B, respectively, via insulating layers so as to vertically move in accordance with the movements of the second electrodes 23A and 238. Hence, the first electrode 21C, insulating film 22C, and second electrode 23C function as a variable capacitor. Note that the electrostatic actuator is applicable to devices other than the variable capacitor, and for example, to a switch.

FIG. 3 is a circuit diagram showing the arrangement of the switch unit 15. One switch unit 15 has a function of applying a driving voltage to only one electrostatic actuator 16 connected to it. Only one booster circuit 13 is provided for the plurality of electrostatic actuators 16-1 to 16-n. The arrangement of switch unit 15-1 will be described below. Remaining switch units 15-2 to 15-n have the same arrangement as switch unit 15-1. Switch unit 15-1 comprises four switches 30-1 to 33-1.

Switches 30-1 and 31-1 have a function of applying the output voltage Vpp from the booster circuit 13 to the electrostatic actuator 16-1. Switch 30-1 has one terminal connected to the output of the booster circuit 13, and the other terminal connected to a node NT1. Switch 31-1 has one terminal connected to the output of the booster circuit 13, and the other terminal connected to a node NB1.

Switches 32-1 and 33-1 serve as discharge switches, and have a function of applying ground voltage Vss (=0 V) to the electrostatic actuator 16-1. Switch 32-1 has one terminal connected to node NT1, and the other terminal grounded. Switch 33-1 has one terminal connected to node NB1, and the other terminal grounded.

Node NB1 is connected to a first electrode 21-1 of the electrostatic actuator 16-1. Node NT1 is connected to a second electrode 23-1 of the electrostatic actuator 16-1. This allows switch unit 15-1 to apply voltage Vpp or ground voltage Vss to each of the first electrode 21-1 and the second electrode 23-1. Based on the voltages applied from switch unit 15-1 to the first electrode 21-1 and the second electrode 23-1, the electrostatic actuator 16-1 is set in one of an up state and a down state.

Figure 4:
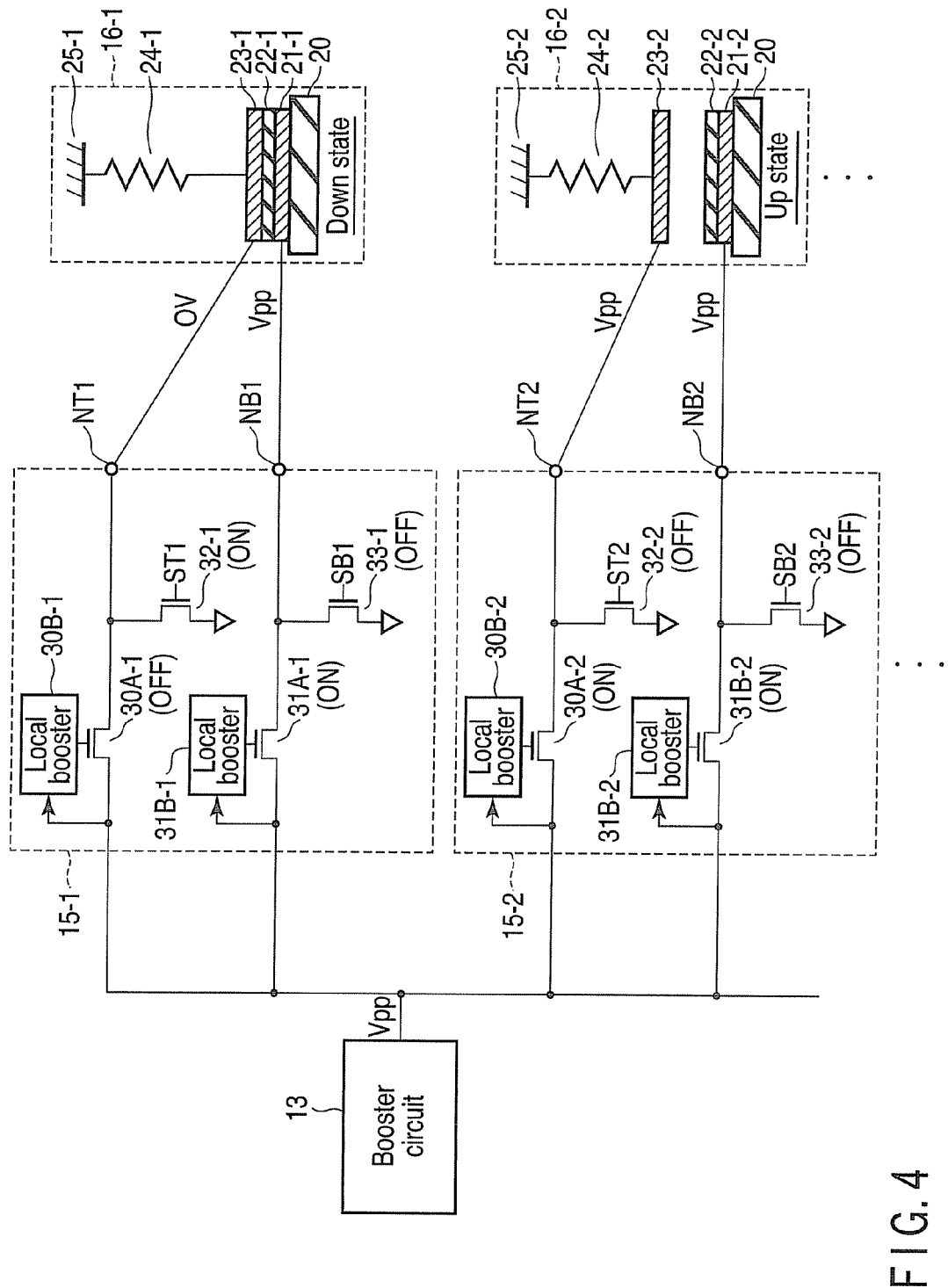
FIG. 4 is a circuit diagram showing a detailed example of the arrangement of the switch unit 15.

FIG. 4 is a circuit diagram showing a detailed example of the arrangement of the switch unit 15. As switch elements 30A and 31A included in switches 30 and 31, respectively, metal oxide semiconductor field-effect transistors (MOSFETs) for a high withstanding voltage are used. For example, N-channel MOSFETs (NMOSFETs) are used. As switches 32 and 33, for example, NMOSFETs are used.

The NMOSFET 30A has its drain connected to the output of the booster circuit 13, and its source connected to node NT. A local booster 30B controls the gate voltage of the NMOSFET 30A.

The NMOSFET 31A has its drain connected to the output of the booster circuit 13, and its source connected to node NB. A local booster 31B controls the gate voltage of the NMOSFET 31A.

The local boosters 30B and 31B apply a gate voltage higher than voltage Vpp to the gates of the NMOSFETs 30A and 31A, respectively, to turn them on. The local boosters 30B and 31B apply a gate voltage of zero to the gates of the NMOSFETs 30A and 31A, respectively, to turn them off. To do this, each of the local boosters 30B and 31B comprises a booster circuit which boosts voltage Vpp, and a discharge circuit which discharges the gate of the NMOSFET to 0 V. The local boosters 30B and 31B on/off-control the NMOSFETs 30A and 31A based on a control signal supplied from the control circuit 17.

Each of switches 32 and 33 comprises, for example, an NMOSFET. The NMOSFET 32 has its drain connected to node NT, and its source grounded. The control circuit 17 supplies a control signal ST to the gate of the NMOSFET 32. The NMOSFET 32 is turned on/off based on the control signal ST.

The NMOSFET 33 has its drain connected to node NB, and its source grounded. The control circuit 17 supplies a control signal SB to the gate of the NMOSFET 33. The NMOSFET 33 is turned on/off based on the control signal SB.

(Operation)

The operation of the electrostatic actuator apparatus 10 having the above-described arrangement will be described next. As shown in FIG. 3, each switch unit 15 can apply voltage Vpp or zero voltage to the first electrode 21 and the second electrode 23 of the corresponding electrostatic actuator 16. Voltage Vpp is generated by the booster circuit 13. Voltage Vpp is set to be equal to or higher than the driving voltage (pull-in voltage) of the electrostatic actuator 16.

The electrostatic actuator 16 can assume the up state and down state. In the up state, the second electrode 23 is separated from the insulating film 22. In the down state, the second electrode 23 is in contact with the insulating film 22.

To set the electrostatic actuator 16 in the down state, a voltage equal to or higher than the driving voltage (pull-in voltage) is applied between the first electrode 21 and the second electrode 23. The switch unit 15 applies Vpp and 0 V, or 0 V and Vpp to the first electrode 21 and the second electrode 23, respectively. In this case, switch 30 is turned off, switch 31 is turned on, switch 32 is turned on, and switch 33 is turned off. This makes it possible to apply Vpp and 0 V to the first electrode 21 and the second electrode 23, respectively. Alternatively, switch 30 is turned on, switch 31 is turned off, switch 32 is turned off, and switch 33 is turned on. This makes it possible to apply 0 V and Vpp to the first electrode 21 and the second electrode 23, respectively. The control of switches 30 to 33 is implemented by causing the control circuit 17 to supply the control signals to the switch unit 15.

On the other hand, to set the electrostatic actuator 16 in the up state, a voltage lower than the pull-in voltage is applied between the first electrode 21 and the second electrode 23. In general, to make the electrostatic actuator 16 transit to the up state, zero voltage is applied to the first electrode 21 and the second electrode 23 from the viewpoint of reduction of power consumption or the like. In this embodiment, the up state of the electrostatic actuator 16 is implemented by applying voltage Vpp to the first electrode 21 and the second electrode 23. The reason will be explained below.

When the electrostatic actuator 16 is set in the up state using zero voltage as before, transition from the up state to the down state requires applying voltage Vpp to one of the electrodes. When voltage Vpp is applied to the first electrode 21 or the second electrode 23, the electrostatic actuator 16 transits to the down state. At this time, however, the capacitance of the electrostatic actuator 16 increases. This means that the capacitance of the application destination of voltage Vpp increases. Especially when making all the electrostatic actuators 16 transit from the up state to the down state, the capacitance of the application destination of voltage Vpp enormously increases. For this reason, the booster circuit takes time to generate and apply the boosted potential Vpp, resulting in a longer switching time of the electrostatic actuator 16.

However, the electrostatic actuator 16 is set in the up state using voltage Vpp, as in this embodiment. When making the electrostatic actuators 16 transit from the up state to the down state, the first electrode 21 and the second electrode 23 can be set in a bias state of 0 V/Vpp or Vpp/0 V by discharging the first electrode 21 or the second electrode 23 to 0 V in transition from the up state to the down state. The first electrode 21 and the second electrode 23 are discharged by switches 32 and 33. The time required for the discharge operation is much shorter than the time for applying the boosted voltage Vpp. Hence, the bias state for the down state can be implemented more quickly by applying voltage Vpp to the first electrode 21 and the second electrode 23 than in the conventional method of applying zero voltage to them. It is therefore possible to shorten the switching time of the electrostatic actuator 16.

In the actual operation, to set the electrostatic actuator 16 in the up state, switch 30 is turned on, switch 31 is turned on, switch 32 is turned off, and switch 33 is turned off. This makes it possible to apply voltage Vpp to the first electrode 21 and the second electrode 23.

Figure 5A:
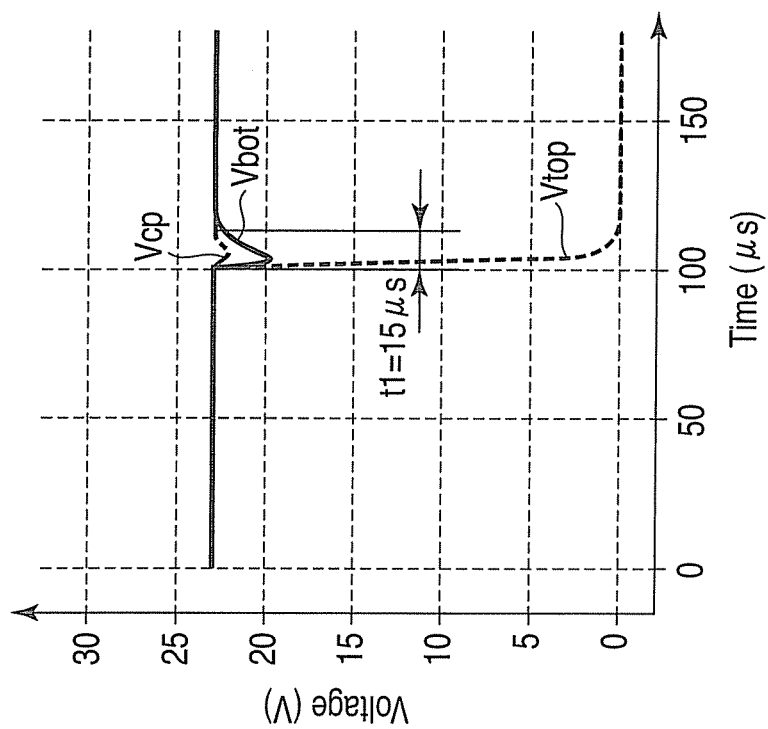
FIGS. 5A and 5B are timing charts showing waveforms which simulate transition of an electrostatic actuator 16 from an up state to a down state.
Figure 5B:
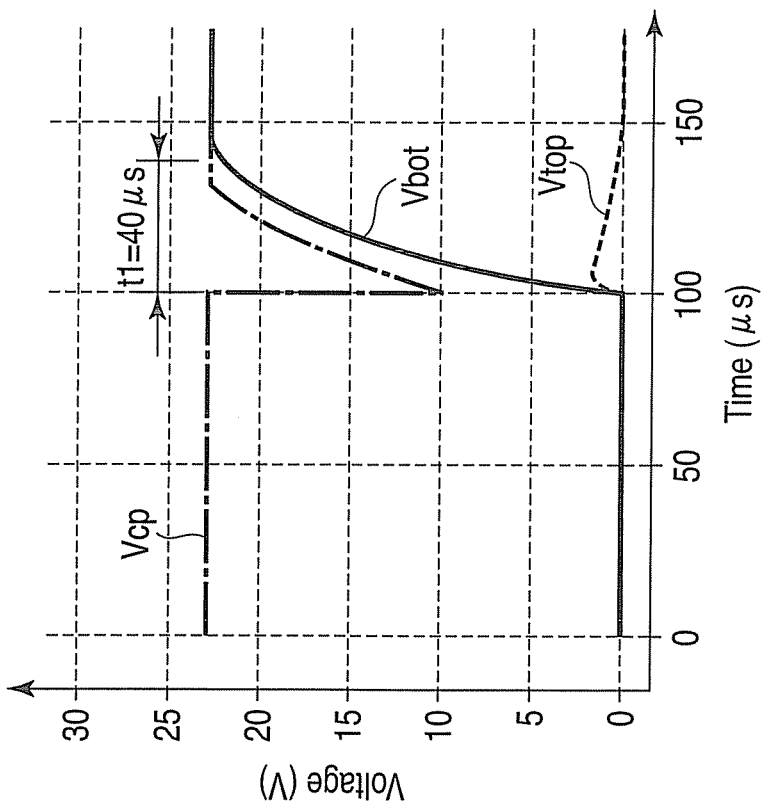

FIGS. 5A and 5B show waveforms which simulate transition of the electrostatic actuator 16 from the up state to the down state. FIG. 5A shows waveforms (comparative example) when the up state is implemented by applying zero voltage to the first electrode 21 and the second electrode 23.

FIG. 5B shows waveforms (this embodiment) when the up state is implemented by applying voltage Vpp to the first electrode 21 and the second electrode 23. The abscissa in FIGS. 5A and 5B represents time (μs), and the ordinate represents voltage (V). In FIGS. 5A and 5B, Vcp represents a voltage obtained by measuring, at an input terminal of the switch unit 15 (e.g., one terminal of switch 30), voltage Vpp generated by the booster circuit 13, Vbot represents the voltage at the first electrode 21 of the electrostatic actuator 16, and Vtop represents the voltage at the second electrode 23 of the electrostatic actuator 16.

FIG. 5A shows the bias method of comparative example. The up state of the electrostatic actuator 16 is implemented by applying zero voltage to the first electrode 21 and the second electrode 23, i.e., setting Vbot and Vtop to zero. After that, the down state of the electrostatic actuator 16 is implemented by applying Vpp and 0 V to the first electrode 21 and the second electrode 23, respectively, i.e., setting Vbot and Vtop to Vpp and 0 V, respectively. In this case, as shown in FIG. 5A, a time t1 from switching the voltages by switches 30 to 33 to implementing the bias state for the down state is about 40 μs.

Referring to FIG. 5A, voltage Vcp drops greatly when the first electrode 21 has been set to voltage Vpp. This is because the switch connected to the electrostatic actuator 16 is turned on to transfer a large charge to the first electrode 21. Upon detecting the drop in voltage Vcp, the booster circuit 13 tries to restore the original voltage. However, voltage Vcp instantaneously drops greatly because of the slow response. The drop in voltage is decided based on the capacitance of the node of Vcp and the capacitance of the node of Vtop at the application destination. In FIG. 5A, voltage Vtop instantaneously rises slightly when the first electrode 21 has been set to voltage Vpp. This occurs because of the capacitive coupling between the first electrode 21 and the second electrode 23 when voltage Vbot rises. The second electrode 23 is grounded via the discharge transistor 32. However, voltage Vtop instantaneously rises slightly because of the presence of the resistance component of the transistor.

FIG. 5B shows the bias method of this embodiment. The up state of the electrostatic actuator 16 is implemented by applying voltage Vpp to the first electrode 21 and the second electrode 23, i.e., setting Vbot and Vtop to voltage Vpp. After that, the down state of the electrostatic actuator 16 is implemented by discharging only the second electrode 23 to 0 V, i.e., setting only Vtop to zero. In this case, the time t1 is only 15 μs, as shown in FIG. 5B. That is, in this embodiment, the switching time of the electrostatic actuator 16 can be shortened.

Referring to FIG. 5B, voltage Vcp rarely drops when the second electrode 23 has been set to 0 V. This is because the capacitance of the application destination of the booster circuit 13 decreases when the electrostatic actuator 16 transits from the up state to the down state. That is, the variation in voltage Vcp is smaller in this embodiment than in the comparative example. The small drop in voltage Vbot in FIG. 5B is caused by the capacitive coupling between the first electrode 21 and the second electrode 23.

(Effects)

As described above in detail, in this embodiment, the electrostatic actuator apparatus 10 comprises the electrostatic actuator 16, the booster circuit 13 which generates voltage Vpp equal to or higher than the driving voltage (pull-in voltage) of the electrostatic actuator 16, and the switch unit 15 which is connected between the electrostatic actuator 16 and the booster circuit 13 and controls the operation of the electrostatic actuator 16. To set the electrostatic actuator 16 in the down state, the switch unit 15 applies 0 V and Vpp, or Vpp and 0 V to the first electrode 21 and the second electrode 23 of the electrostatic actuator 16, respectively. On the other hand, to set the electrostatic actuator 16 in the up state, the switch unit 15 applies voltage Vpp to the first electrode 21 and the second electrode 23 of the electrostatic actuator 16.

Hence, according to this embodiment, to make the electrostatic actuator 16 transit from the up state to the down state, one of the first electrode 21 and the second electrode 23 is discharged to 0 V. This makes it possible to shorten the switching time of the electrostatic actuator 16.

In terms of the load capacitance of the booster circuit 13, when the distance between the first electrode 21 and the second electrode 23 increases, the capacitance of the electrostatic actuator 16 decreases, and the load capacitance of the booster circuit 13 decreases. This makes it possible to shorten the time necessary to generate and apply the boosted potential Vpp. Note that in this embodiment, to make the electrostatic actuator transit from the down state to the up state, it is necessary to apply voltage Vpp to the electrode to which zero voltage has been applied in the down state. In this case, however, if the potential difference between the first electrode 21 and the second electrode 23 decreases to the pull-out voltage or less, the two electrodes separated from each other. That is, displacement of the electrostatic actuator 16 starts before application of voltage Vpp ends. Hence, the transition time from the down state to the up state of the electrostatic actuator 16 is shorter than the transition time from the up state to the down state by the conventional method. As a result, employing the bias method of the embodiment makes it possible to generally shorten the switching time of the electrostatic actuator 16.

The circuit arrangement shown in FIG. 3 of this embodiment can implement two bias states for the down state, i.e., Vpp/0 V and 0 V/Vpp. This means that the direction of the electric field between the electrodes can be reversed using only a positive high voltage (i.e., without using a negative voltage). Charging can be suppressed by changing the direction of the electric field between the first electrode 21 and the second electrode 23 using the function, for example, every predetermined time. Charging indicates a phenomenon in which after the electrostatic actuator 16 repeats driving, the insulating film 22 accumulates charges, and the second electrode 23 can hardly separate from the insulating film 22 because of the charges. It is consequently possible to reduce stiction errors caused by charging.

Note that when the up state is held by voltage Vpp, power consumption increases if a leakage current exists at the application destination of the boosted voltage. However, since the leakage current in the MEMS electrostatic actuator 16 is so small that it is negligible, any increase in power consumption can be suppressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of driving an electrostatic actuator comprising a first electrode provided on a substrate, a second electrode arranged above the first electrode to be movable in a vertical direction, and an insulating film provided between the first electrode and the second electrode, the method comprising:

boosting a power supply voltage to generate a driving voltage of the electrostatic actuator;

controlling an operation of the electrostatic actuator by applying voltages to the first electrode and the second electrode to set the electrostatic actuator in an up state or a down state, either the first electrode or the second electrode being not in contact with the insulating film in the up state, both the first electrode and the second electrode being in contact with the insulating film in the down state; and applying the driving voltages to both the first electrode and the second electrode when the electrostatic actuator is switched from the down state to the up state and while the electrostatic actuator is in the up state.

2. The method of claim 1, further comprising applying the driving voltage and a ground voltage or the ground voltage and the driving voltage to the first electrode and the second electrode, respectively, when setting the electrostatic actuator in a down state.

3. An electrostatic actuator apparatus comprising:

an electrostatic actuator comprising a first electrode provided on a substrate, a second electrode arranged above the first electrode to be movable in a vertical direction, and an insulating film provided between the first electrode and the second electrode;

a booster circuit configured to boost a power supply voltage to generate a driving voltage of the electrostatic actuator; and a switch unit configured to control an operation of the electrostatic actuator by applying voltages to the first electrode and the second electrode, and to set the electrostatic actuator in an up state or a down state, either the first electrode or the second electrode being not in contact with the insulating film in the up state, both the first electrode and the second electrode being in contact with the insulating film in the down state, wherein the switch unit is configured to apply the driving voltages to both the first electrode and the second electrode when the electrostatic actuator is switched from the down state to the up state and while the electrostatic actuator is in the up state.

4. The apparatus of claim 3, wherein the switch unit applies the driving voltage and a ground voltage or the ground voltage and the driving voltage to the first electrode and the second electrode, respectively, when setting the electrostatic actuator in a down state.

5. The apparatus of claim 3, wherein the switch unit comprises a first switch which applies the driving voltage to the first electrode, a second switch which applies the driving voltage to the second electrode, a third switch which discharges the first electrode, and a fourth switch which discharges the second electrode.

6. The apparatus of claim 5, wherein the first to fourth switches are first to fourth MOSFETs, respectively.

7. The apparatus of claim 6, wherein the switch unit comprises a local booster which generates a gate voltage to turn on/off each of the first and second MOSFETs.

8. The apparatus of claim 3, wherein the electrostatic actuator comprises an elastic body which supports the second electrode.

9. The method of claim 1, further comprising discharging either the first electrode or the second electrode to a ground voltage when the electrostatic actuator is switched from the up state to the down state.

10. The apparatus of claim 3, wherein the switch unit discharges either the first electrode or the second electrode to a ground voltage when the electrostatic actuator is switched from the up state to the down state.

* * * * *